(12) United States Patent
Tsujita et al.

(10) Patent No.: US 9,046,646 B2
(45) Date of Patent: *Jun. 2, 2015

(54) OPTO-ELECTRIC HYBRID BOARD AND METHOD OF MANUFACTURING SAME

(71) Applicant: Nitto Denko Corporation, Ibaraki-shi, Osaka (JP)

(72) Inventors: Yuichi Tsujita, Ibaraki (JP); Yasuto Ishimaru, Ibaraki (JP); Akihito Matsutomi, Ibaraki (JP); Naoyuki Tanaka, Ibaraki (JP); Yasufumi Yamamoto, Ibaraki (JP); Mayu Ozaki, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 186 days.

This patent is subject to a terminal disclaimer.

(21) Appl. No.: 13/775,891

(22) Filed: Feb. 25, 2013

(65) Prior Publication Data

US 2013/0243371 A1    Sep. 19, 2013

(30) Foreign Application Priority Data

Mar. 16, 2012 (JP) ................................. 2012-060631

(51) Int. Cl.
*G02B 6/12* (2006.01)
*G02B 6/42* (2006.01)
(Continued)

(52) U.S. Cl.
CPC .......... *G02B 6/12004* (2013.01); *G02B 6/4214* (2013.01); *G02B 6/43* (2013.01); *G02B 6/136* (2013.01); *G02B 6/138* (2013.01)

(58) Field of Classification Search
CPC ........ G02B 6/4214; G02B 6/43; G02B 6/136; G02B 6/138; G02B 6/12004

USPC ...................... 385/14, 129–132, 32
See application file for complete search history.

(56) References Cited

U.S. PATENT DOCUMENTS 8,768,114 B2 * 7/2014 Tsujita et al. .................. 385/14
2008/0252620 A1 10/2008 Shimizu
(Continued)

FOREIGN PATENT DOCUMENTS

JP    2009-265342 A    11/2009
JP    2010-164655 A    7/2010
(Continued)

OTHER PUBLICATIONS

European Search Report dated Jul. 25, 2013, issued in European Patent Application No. 13156938.6.
(Continued)

*Primary Examiner* — Akm Enayet Ullah
*Assistant Examiner* — Michael Mooney
(74) *Attorney, Agent, or Firm* — Westerman, Hattori, Daniels & Adrian, LLP

(57) ABSTRACT

An opto-electric hybrid board includes an electric circuit board, an optical waveguide, and a metal layer. The electric circuit board includes an insulative layer having front and back surfaces, and electrical interconnect lines formed on the front surface of the insulative layer. The optical waveguide includes a first cladding layer and cores, and the optical waveguide is formed on the back surface of the insulative layer of the electric circuit board. The metal layer is formed between the first cladding layer of the optical waveguide and the back surface of the insulative layer of the electric circuit board. Part of the opto-electric hybrid board is formed as a to-be-bent portion. The metal layer is partially removed in a portion corresponding to the to-be-bent portion. A first cladding layer of the optical waveguide fills a site where the metal layer is removed.

3 Claims, 7 Drawing Sheets

(51) Int. Cl.
*G02B 6/125* (2006.01)
*G02B 6/43* (2006.01)
*G02B 6/136* (2006.01)
*G02B 6/138* (2006.01)

(56) References Cited

U.S. PATENT DOCUMENTS

2009/0269704 A1 10/2009 Hodono
2010/0195967 A1 8/2010 Wang et al.
2011/0097034 A1 4/2011 Uemura et al.
2011/0188816 A1 8/2011 Uemura et al.
2011/0222815 A1 9/2011 Hamana et al.
2012/0045168 A1 2/2012 Uemura et al.

FOREIGN PATENT DOCUMENTS

JP 2011-221143 A 11/2011
WO 2011/125658 A1 10/2011

OTHER PUBLICATIONS

European Search Report issued in European patent application No. 13156933.7, Jul. 22, 2013, 6 pages.

* cited by examiner

RELATED ART

OPTO-ELECTRIC HYBRID BOARD AND METHOD OF MANUFACTURING SAME

BACKGROUND OF THE INVENTION

1. Field of the Invention

The present invention relates to an opto-electric hybrid board including an optical waveguide and an electric circuit board which are stacked together, and a method of manufacturing the same.

2. Description of the Related Art

With the increase in the amount of transmission information, optical interconnection in addition to electrical interconnection has been used in recent electronic devices and the like. As an example of such a technique, an opto-electric hybrid board has been disclosed in Japanese Laid-open Patent Application Publication No. 2010-164655. As shown in FIG. 7, this opto-electric hybrid board includes: an electric circuit board $E_0$ including an insulative substrate 51 made of polyimide and the like, and electrical interconnect lines 52 formed on the front surface of the insulative substrate 51; and an optical waveguide (optical interconnect lines) $W_0$ (including an under cladding layer 56, cores 57 and an over cladding layer 58) made of epoxy resin and the like and stacked on the back surface (a surface opposite from the surface with the electrical interconnect lines 52 formed thereon) of the insulative substrate 51.

In the aforementioned opto-electric hybrid board, however, the insulative substrate 51 (polyimide resin and the like) and the optical waveguide $W_0$ (epoxy resin and the like) are in contact with each other. A difference in coefficient of linear expansion between the insulative substrate 51 and the optical waveguide $W_0$ causes stresses and slight bending in the optical waveguide $W_0$ at ambient temperature, resulting in increased light propagation losses in the optical waveguide $W_0$.

Another opto-electric hybrid board, on the other hand, has been disclosed in Japanese Laid-open Patent Application Publication No. 2009-265342. As shown in FIG. 8, this opto-electric hybrid board includes a stainless steel layer $M_0$ provided entirely between the insulative substrate 51 and the optical waveguide $W_0$. In this opto-electric hybrid board, the stainless steel layer $M_0$ serves as a reinforcement to prevent stresses and slight bending in the optical waveguide $W_0$.

The aforementioned conventional opto-electric hybrid boards (with reference to FIGS. 7 and 8) have been proposed, based on the assumption that they are used when in a flat configuration. Recently, there has been a need for size reduction and the like in the aforementioned electronic devices and the like. Accordingly, a need has arisen for the use of such an opto-electric hybrid board in a small space and in a movable section such as a hinge.

SUMMARY OF THE INVENTION

To meet the need for the use of the opto-electric hybrid board in a small space and in a movable section such as a hinge, part of the opto-electric hybrid board can have bendability, thereby achieving the storage of the opto-electric hybrid board in a small space and the use thereof in a movable section. However, the opto-electric hybrid board (with reference to FIG. 8) including the stainless steel layer $M_0$ provided entirely as mentioned above is poor in bendability because the stainless steel layer $M_0$ acts as an impediment to bending. Also, when this opto-electric hybrid board is used in a section such as the hinge which is repeatedly bent, a break occurs in the stainless steel layer $M_0$ due to the metal fatigue of the stainless steel layer $M_0$ and the like to accordingly cause a break in the cores 57, so that the optical interconnect lines can no longer be used. In other words, this opto-electric hybrid board is poor in resistance to repeated bending. The conventional opto-electric hybrid boards still have room for improvement in these regards.

An opto-electric hybrid board which is excellent in bendability, in suppressing the increase in light propagation losses and in resisting repeated bending, and a method of manufacturing the same are provided.

The opto-electric hybrid board comprises: an electric circuit board including an insulative layer having front and back surfaces, and electrical interconnect lines formed on the front surface of the insulative layer; an optical waveguide including a cladding layer and cores, the optical waveguide being formed on the back surface of the insulative layer of the electric circuit board; and a metal layer formed between the cladding layer of the optical waveguide and the back surface of the insulative layer of the electric circuit board, part of the opto-electric hybrid board being formed as a to-be-bent portion, the metal layer being partially removed in a position corresponding to the to-be-bent portion, the cladding layer of the optical waveguide filling a site where the metal layer is removed.

The method of manufacturing the opto-electric hybrid board comprises the steps of: forming an insulative layer on a first surface of a metal layer; forming electrical interconnect lines on a surface of the insulative layer; and forming an optical waveguide on a second surface of the metal layer, part of the metal layer corresponding to a to-be-bent portion of the opto-electric hybrid board being removed by etching prior to the step of forming the optical waveguide.

The opto-electric hybrid board is excellent in bendability because the metal layer is partially removed in a position corresponding to the to-be-bent portion so as not to hinder bending. The repeated bending in the site where the metal layer is removed causes no breaks in the metal layer to cause no breaks in cores of the optical waveguide. Thus, the opto-electric hybrid board is excellent in resistance to repeated bending. The site where the metal layer is removed is not hollow but is filled with the cladding layer of the optical waveguide. This stabilizes the shape of the cores of the optical waveguide to maintain proper light propagation even if the to-be-bent portion is bent. In the portions other than the to-be-bent portion, the metal layer is present between the electric circuit board and the optical waveguide to serve as a reinforcement. This prevents stresses and slight bending in the optical waveguide to suppress the increase in the light propagation losses in the optical waveguide. In this manner, the opto-electric hybrid board is excellent in bendability, in resistance to repeated bending and in suppressing the increase in light propagation losses.

Preferably, the metal layer is patterned in a position corresponding to the pattern of the cores of the optical waveguide in portions other than the to-be-bent portion, and the cladding layer of the optical waveguide fills a site where the metal layer is removed by the patterning. In this case, the metal layer corresponding to the portions other than the to-be-bent portion is formed dispersedly, rather than entirely, so that the portions other than the to-be-bent portion are excellent in flexibility. Thus, if the portions other than the to-be-bent portion are impacted, the portions other than the to-be-bent portion are easily deformed to lessen the impact. Additionally, the aforementioned deformation, if any, occurs preferentially in the sites where the metal layer is removed by the patterning (the sites filled with the cladding layer) because the patterned metal layer serves as a reinforcement. As a result, if deformation occurs in the portions other than the to-be-bent portion of the opto-electric hybrid board, the deformation of the cores is prevented, whereby proper light propagation is maintained.

In the method of manufacturing the opto-electric hybrid board, part of the metal layer corresponding to a to-be-bent portion of the opto-electric hybrid board is removed by etching prior to the formation of the optical waveguide. Thus, after the formation of the optical waveguide, the cladding layer of the optical waveguide fills the site where the metal layer is removed. The bending is easily done in the to-be-bent portion because the metal layer is removed and absent in the to-be-bent portion. The site where the metal layer is removed is filled with the cladding layer of the optical waveguide. This provides the opto-electric hybrid board which is capable of stabilizing the shape of the cores of the optical waveguide to maintain proper light propagation even if the aforementioned bending is done.

DETAILED DESCRIPTION OF THE INVENTION

Preferred embodiments according to the present invention will now be described in detail with reference to the drawings.

Figure 1A:
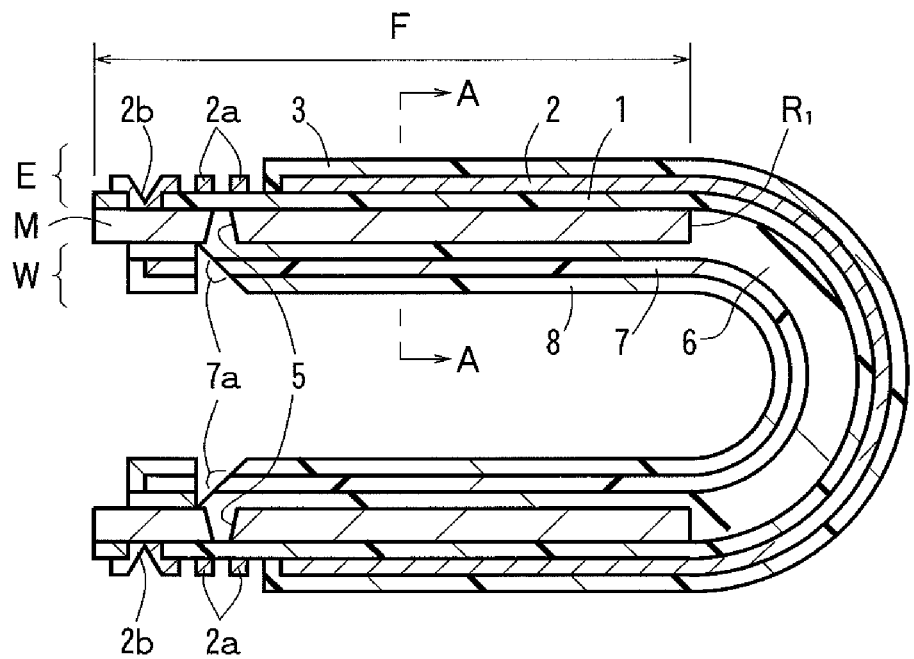
FIG. 1A is a longitudinal sectional view schematically showing an opto-electric hybrid board according to a first preferred embodiment.
Figure 1B:
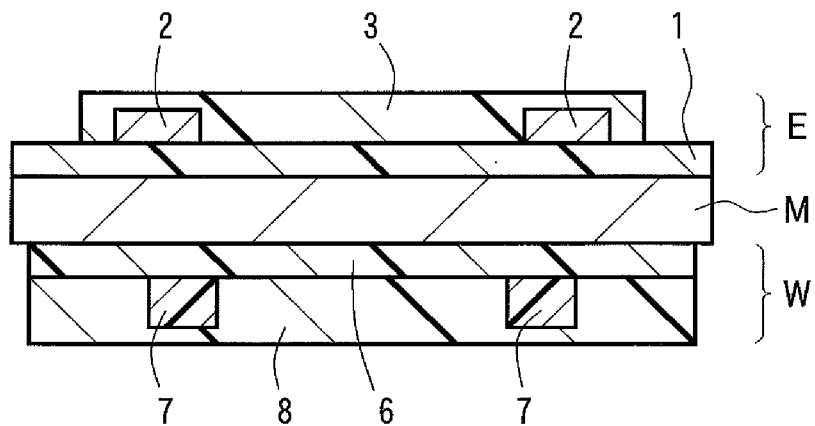
FIG. 1B is an enlarged view of a section taken along the line A-A of FIG. 1A.

FIG. 1A is a longitudinal sectional view schematically showing an opto-electric hybrid board according to a first preferred embodiment. FIG. 1B is an enlarged view of a cross section (a section taken along the line A-A of FIG. 1A) schematically showing a portion other than a bent portion of the opto-electric hybrid board. The opto-electric hybrid board according to the first preferred embodiment is a strip-shaped opto-electric hybrid board which includes: an electric circuit board E including an insulative layer 1 having front and back surfaces, and electrical interconnect lines 2 formed on the front surface of the insulative layer 1; an optical waveguide W including a first cladding layer 6 and cores 7, the optical waveguide being formed on the back surface of the insulative layer 1 of the electric circuit board E; and a metal layer M formed between the first cladding layer 6 of the optical waveguide W and the back surface of the insulative layer 1 of the electric circuit board E. As shown in FIG. 1A, the opto-electric hybrid board is bent in the longitudinal middle thereof, with the optical waveguide W positioned inside. In the bent portion (the longitudinal middle) of the opto-electric hybrid board, the metal layer M is partially removed, and the first cladding layer (under cladding layer) 6 of the optical waveguide W fills a site $R_1$ where the metal layer M is removed. As shown in FIG. 1B, the metal layer M is formed entirely in a conventional manner in portions other than the bent portion (portions in a region F).

The opto-electric hybrid board is not hindered from being bent and is excellent in bendability because the metal layer M is absent in the bent portion of the opto-electric hybrid board. Also, part of the bent portion where the metal layer M is absent is not hollow but is filled with the first cladding layer 6 of the optical waveguide W. This allows the bent portion to be stabilized in the shape of cores 7 of the optical waveguide W, thereby maintaining proper light propagation. In the portions other than the bent portion, the metal layer M is formed entirely to serve as a reinforcement, thereby preventing stresses and slight bending in the optical waveguide W. As a result, the increase in light propagation losses in the optical waveguide W is suppressed.

More specifically, the electric circuit board E includes the insulative layer 1, and the electrical interconnect lines 2 formed on the front surface of the insulative layer 1, as stated above. In opposite longitudinal end portions of the opto-electric hybrid board, uncovered optical element mounting pads 2a are formed on the front surface of the insulative layer 1, and uncovered grounding electrodes 2b extend through the insulative layer 1 into contact with the metal layer M on the back surface of the insulative layer 1. The optical element mounting pads 2a and the grounding electrodes 2b are portions of the electrical interconnect lines 2. Portions of the electrical interconnect lines 2 other than the optical element mounting pads 2a and the grounding electrodes 2b are covered with a coverlay 3, and are insulated and protected. The insulative layer 1 is transparent.

A portion of the metal layer M corresponding to the bent portion is removed (with reference to FIG. 1A), and portions of the metal layer M other than the bent portion are formed entirely (with reference to FIG. 1B). The opposite longitudinal end portions of the metal layer M have through holes 5 for a light path which are in positions corresponding respectively to the optical element mounting pads 2a of the electric circuit board E (with reference to FIG. 1A).

As shown in FIGS. 1A and 1B, the optical waveguide W includes the first cladding layer (under cladding layer) 6, the cores 7 formed in a predetermined pattern on the front surface of the first cladding layer 6, and a second cladding layer (over cladding layer) 8 formed on the front surface of the first cladding layer 6 so as to cover the cores 7. The first cladding layer 6 has a back surface (a surface opposite from the surface with the cores 7 formed thereon) in contact with the metal layer M, and fills the site $R_1$ where the metal layer M is removed and the through holes 5 for an optical path. In the opposite longitudinal end portions of the optical waveguide W, portions of the cores 7 corresponding to the optical element mounting pads 2a of the electric circuit board E are in the form of inclined surfaces at 45 degrees with respect to the longitudinal direction of the cores 7. The inclined surfaces serve as reflecting surfaces 7a capable of reflecting light beams to propagate light beams between an optical element mounted on the optical element mounting pads 2a and the cores 7. At the reflecting surfaces 7a, the refractive index of the cores 7 is higher than that of air present outside the reflecting surfaces 7a. For this reason, when light beams coming from a light-emitting element (an optical element) and propagated through the cores 7 impinge upon the reflecting surfaces 7a, a majority of the light beams are reflected from the reflecting surfaces 7a to change the optical path thereof by 90 degrees.

Next, a method of manufacturing the opto-electric hybrid board will be described (with reference to FIGS. 2A to 2E and 3A to 3D).

First, the metal layer M of a flat configuration (with reference to FIG. 2A) is prepared. Examples of a material for the formation of the metal layer M include stainless steel, copper, silver, aluminum, nickel, chromium, titanium, platinum and gold. In particular, stainless steel is preferable from the viewpoint of bending resistance and the like. The metal layer M has a thickness in the range of 10 to 70 μm, for example.

Figure 2A:
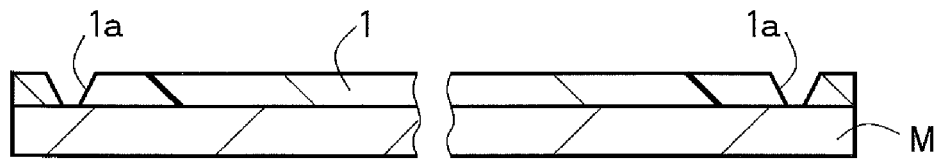
FIGS. 2A to 2E are illustrations schematically showing the steps of producing an electrical circuit board and etching a metal layer in a method of manufacturing the opto-electric hybrid board.

Next, as shown in FIG. 2A, a photosensitive insulating resin including a polyimide resin and the like is applied to the front surface of the metal layer M to form the insulative layer 1 having a predetermined pattern by a photolithographic process. In the first preferred embodiment, holes 1a which uncover the front surface of the metal layer M are formed in the opposite longitudinal end portions, respectively, of the insulative layer 1 for the purpose of forming the grounding electrodes 2b for contact with the metal layer M. The insulative layer 1 has a thickness in the range of 3 to 50 μm.

Figure 2B:
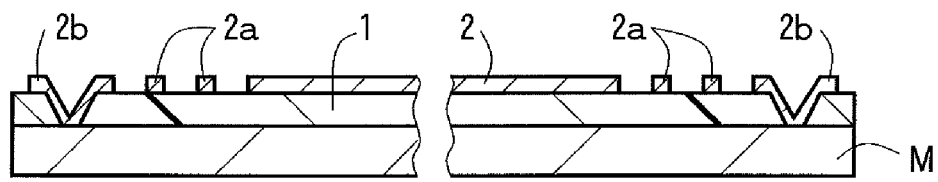

Next, as shown in FIG. 2B, the electrical interconnect lines 2 (including the optical element mounting pads 2a and the grounding electrodes 2b) are formed by a semi-additive process, for example. The semi-additive process is as follows. First, a metal film (not shown) made of copper, chromium and the like is formed on the front surface of the insulative layer 1 by sputtering, electroless plating or the like. This metal film serves as a seed layer (a layer serving as a basis material for the formation of an electroplated layer) for a subsequent electroplating process. Then, a photosensitive resist (not shown) is laminated to the opposite surfaces of a laminate comprised of the metal layer M, the insulative layer 1, and the seed layer. Thereafter, a photolithographic process is performed to form holes having the pattern of the electrical interconnect lines 2 (including the optical element mounting pads 2a and the grounding electrodes 2b) in the photosensitive resist on the side where the seed layer is formed, so that surface portions of the seed layer are uncovered at the bottoms of the holes. Next, electroplating is performed to form an electroplated layer made of copper and the like in a stacked manner on the surface portions of the seed layer uncovered at the bottoms of the holes. Then, the photosensitive resist is stripped away using an aqueous sodium hydroxide solution and the like. Thereafter, a portion of the seed layer on which the electroplated layer is not formed is removed by soft etching. Laminate portions comprised of the remaining seed layer and the electroplated layer are the electrical interconnect lines 2 (including the optical element mounting pads 2a and the grounding electrodes 2b).

Figure 2C:
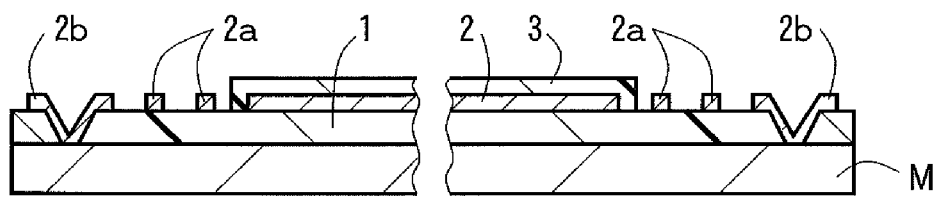

Then, an electroless plated layer made of nickel and the like (not shown) is formed on the front surface of the electrical interconnect lines 2 (including the optical element mounting pads 2a and the grounding electrodes 2b). Thereafter, as shown in FIG. 2C, a photosensitive insulating resin including a polyimide resin and the like is applied to a portion of the electrical interconnect lines 2 other than the optical element mounting pads 2a and the grounding electrodes 2b to form the coverlay 3 by a photolithographic process.

Then, the electroless plated layer (not shown) formed on the optical element mounting pads 2a and the grounding electrodes 2b is removed by etching.

Figure 2D:
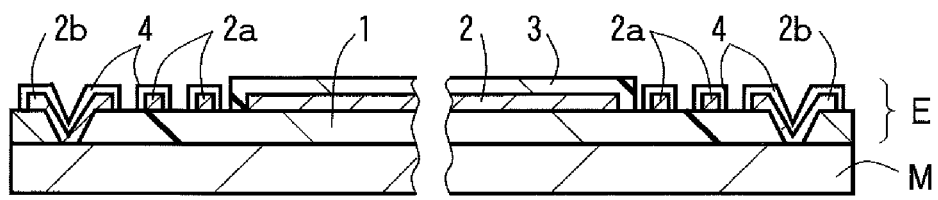

Thereafter, electroplated layers 4 made of gold, nickel and the like are formed in sites where the electroless plated layer is removed, as shown in FIG. 2D. In this manner, the electric circuit board E is formed on the front surface of the metal layer M.

Next, a photosensitive resist (not shown) is laminated to the opposite surfaces of a laminate comprised of the metal layer M and the electric circuit board E. Thereafter, holes are formed by a photolithographic process in portions of the photosensitive resist on the back surface (the surface opposite from the electric circuit board E) of the metal layer M which correspond to the longitudinal middle (a to-be-bent portion) and portions where the through holes for an optical path are to be formed, so that back surface portions of the metal layer M are uncovered at the bottoms (the top surfaces as seen in the figure) of the holes.

Figure 2E:
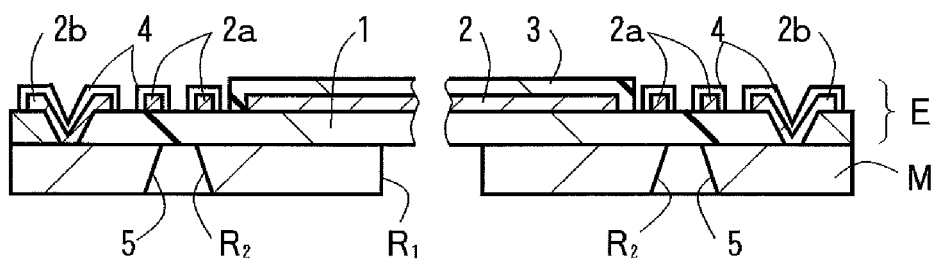

Then, the portions of the metal layer M uncovered at the bottoms of the holes are removed by etching using an aqueous etching solution for the metal material of the metal layer M (for example, an aqueous ferric chloride solution for a stainless steel layer), so that the insulative layer 1 is uncovered at the bottoms (the top surfaces as seen in the figure) of the sites $R_1$ and $R_2$ where the metal layer M is removed, as shown in FIG. 2E. Of the sites $R_1$ and $R_2$, the site $R_1$ in the longitudinal middle corresponds to the to-be-bent portion, and the sites $R_2$ in opposite end portions correspond to the through holes 5 for an optical path. Thereafter, the photosensitive resist is stripped away using an aqueous sodium hydroxide solution and the like.

Figure 3A:
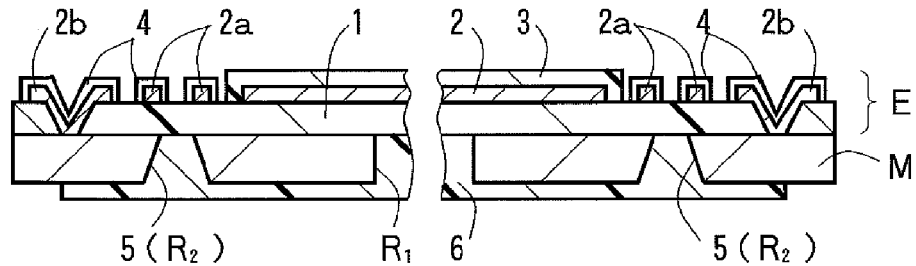
FIGS. 3A to 3D are illustrations schematically showing the steps of producing an optical waveguide in the method of manufacturing the opto-electric hybrid board.

For the formation of the optical waveguide W (with reference to FIG. 3D) on the back surface (the lower surface as seen in the figure) of the metal layer M, a photosensitive resin such as a photosensitive epoxy resin and the like which is a material for the formation of the first cladding layer (under cladding layer) 6 is applied to the back surface of the metal layer M, as shown in FIG. 3A. Thereafter, the applied layer is exposed to irradiation light. This exposure cures the applied layer to form the first cladding layer 6. The first cladding layer 6 fills the to-be-bent portion (the site $R_1$) and the through holes 5 for an optical path (the sites $R_2$) where the metal layer M is removed by etching. The first cladding layer 6 has a thickness (as measured from the back surface of the metal layer M) in the range of 3 to 50 μm. It should be noted that the back surface of the metal layer M is positioned to face upward when the optical waveguide W is formed (when the aforementioned first cladding layer 6, the cores 7 to be described later and the second cladding layer 8 to be described later are formed).

Figure 3B:
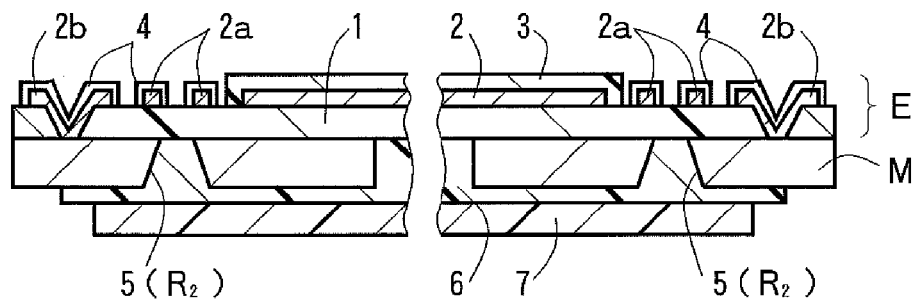

Then, as shown in FIG. 3B, the cores 7 having a predetermined pattern are formed on the front surface (the lower surface as seen in the figure) of the first cladding layer 6 by a photolithographic process. The cores 7 have a thickness in the range of 20 to 100 μm, and a width in the range of 10 to 100 μm. An example of a material for the formation of the cores 7 includes a photosensitive resin similar to that for the first cladding layer 6, and the material used herein has a refractive index higher than that of the material for the formation of the aforementioned first cladding layer 6 and the second cladding layer 8 to be described below (with reference to FIG. 3C). The adjustment of the refractive index may be made, for example, by adjusting the selection of the types of the materials for the formation of the first cladding layer 6, the cores 7 and the second cladding layer 8, and the composition ratio thereof.

Figure 3C:
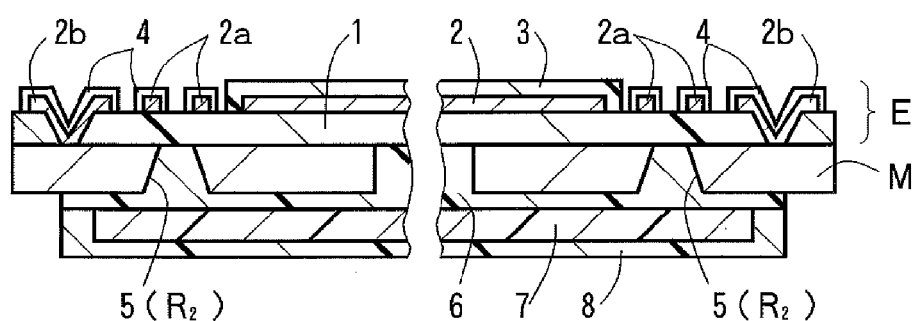

Next, as shown in FIG. 3C, the second cladding layer 8 is formed on the front surface (the lower surface as seen in the figure) of the first cladding layer 6 by a photolithographic process so as to cover the cores 7. The second cladding layer 8 has a thickness (as measured from the front surface of the first cladding layer 6) not less than that of the cores 7 and not greater than 300 µm. An example of a material for the formation of the second cladding layer 8 includes a photosensitive resin similar to that for the first cladding layer 6.

Figure 3D:
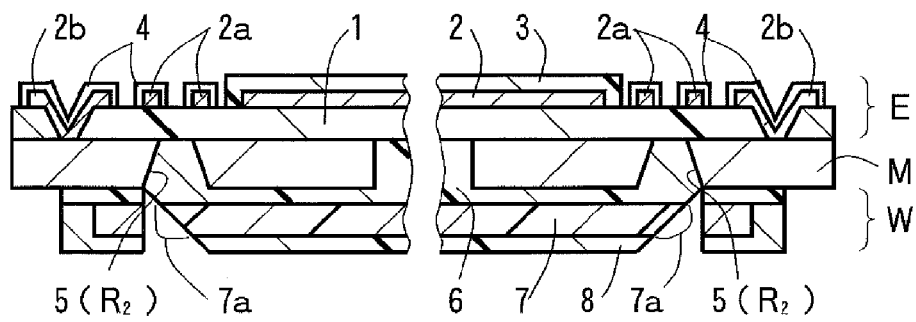

Then, as shown in FIG. 3D, portions (opposite end portions) of the optical waveguide W (positioned in a lower part in the figure) corresponding to the optical element mounting pads 2a of the electric circuit board E are formed into inclined surfaces inclined at 45 degrees with respect to the longitudinal direction of the cores 7 by laser beam machining, cutting using a rotary blade and the like having an included angle of 45 degrees, and the like. Portions of the cores 7 positioned at the inclined surfaces function as the light reflecting surfaces 7a. In this manner, the optical waveguide W is formed on the back surface of the metal layer M.

Thereafter, the to-be-bent portion (in the longitudinal middle) is bent, with the optical waveguide W positioned inside. At this time, the bending is easily done because the metal layer M is removed and absent in the to-be-bent portion. In this manner, the opto-electric hybrid board shown in FIGS. 1A and 1B is provided.

Figure 4A:
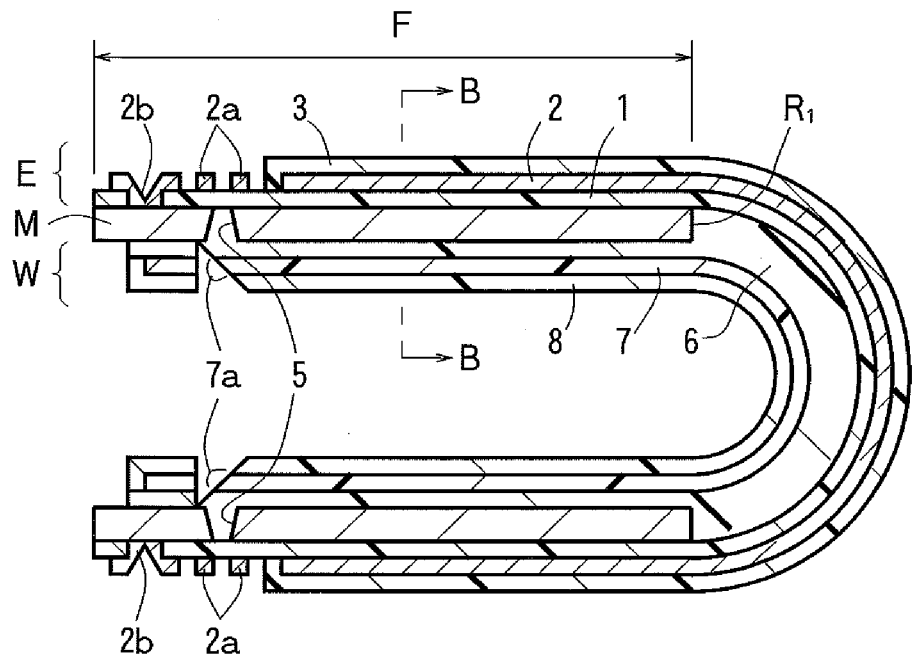
FIG. 4A is a longitudinal sectional view schematically showing an opto-electric hybrid board according to a second preferred embodiment.
Figure 4B:
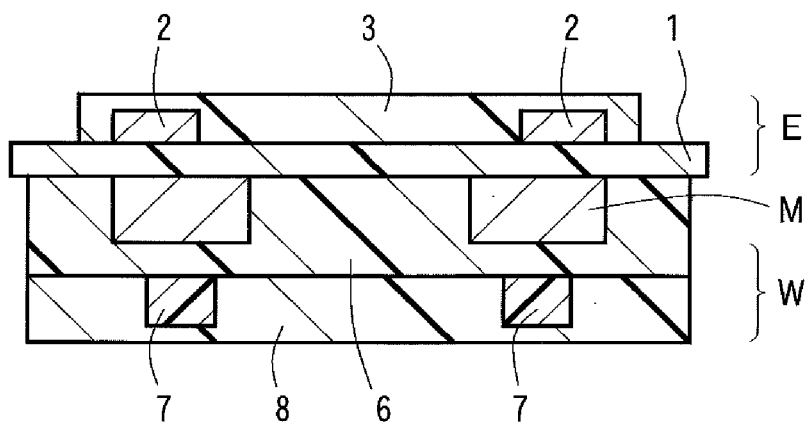
FIG. 4B is an enlarged view of a section taken along the line B-B of FIG. 4A.

FIG. 4A is a longitudinal sectional view schematically showing an opto-electric hybrid board according to a second preferred embodiment. FIG. 4B is an enlarged view of a cross section (a section taken along the line B-B of FIG. 4A) schematically showing a portion other than a bent portion of the opto-electric hybrid board. As shown in FIG. 4B, in portions of the opto-electric hybrid board other than the bent portion (portions in the region F) according to the second preferred embodiment, the metal layer M is patterned in corresponding relation to the pattern of the cores 7 of the optical waveguide W, and the first cladding layer (under cladding layer) 6 of the optical waveguide W fills sites where the metal layer M is removed by the patterning. Other parts of the second preferred embodiment are similar to those of the first preferred embodiment shown in FIGS. 1A and 1B. Like reference numerals and characters are used to designate parts similar to those of the first preferred embodiment.

The opto-electric hybrid board according to the second preferred embodiment has functions and effects to be described below in addition to the functions and effects of the first preferred embodiment. The metal layer M patterned in the portions other than the bent portion is formed dispersedly, rather than entirely, so that the portions other than the bent portion are excellent in flexibility. Thus, if the portions other than the bent portion are impacted, the portions other than the bent portion are easily deformed to lessen the impact. Additionally, the aforementioned deformation, if any, occurs preferentially in the sites where the metal layer M is removed by the patterning (the sites filled with the cladding layer) because the patterned metal layer M serves as a reinforcement. As a result, if deformation occurs in the portions other than the bent portion of the opto-electric hybrid board, the deformation of the cores 7 is prevented, whereby proper light propagation is maintained.

A method of manufacturing the opto-electric hybrid board according to the second preferred embodiment will be described below. The manufacturing method of the second preferred embodiment until the step of forming the electric circuit board E on the front surface of the metal layer M is similar to that of the first preferred embodiment (with reference to FIGS. 2A to 2D). In the subsequent step of etching the metal layer M (with reference to FIG. 2E), portions of the metal layer M other than those corresponding to the pattern of the cores 7 of the optical waveguide W to be formed in a subsequent step, in addition to the to-be-bent portion (the longitudinal middle) and the portions corresponding to the through holes 5 for an optical path, are removed by etching. The step of forming the optical waveguide W and its subsequent steps are similar to those of the first preferred embodiment (with reference to FIGS. 3A to 3D).

Figure 5A:
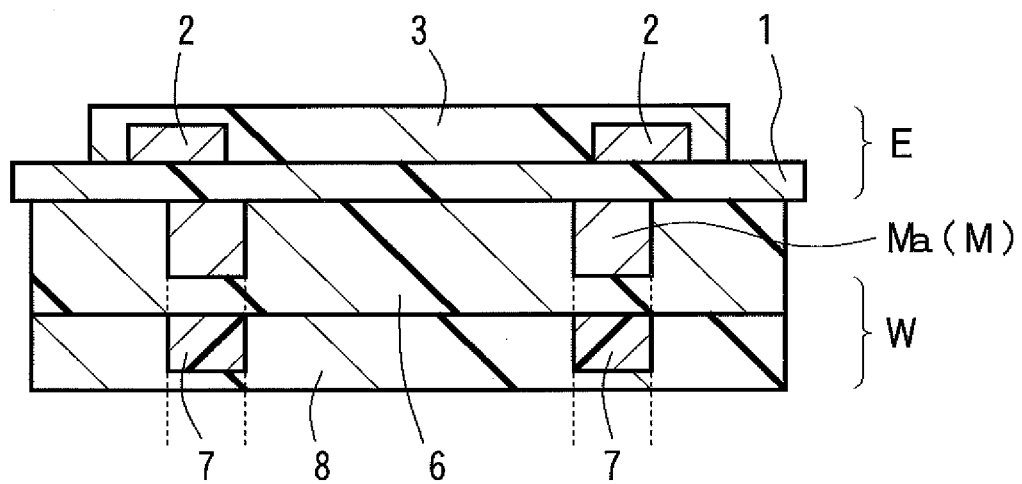
FIGS. 5A and 5B are illustrations schematically showing a relationship between the width of cores in the opto-electric hybrid board and the width of a patterned portion of the metal layer according to the second preferred embodiment.
Figure 5B:
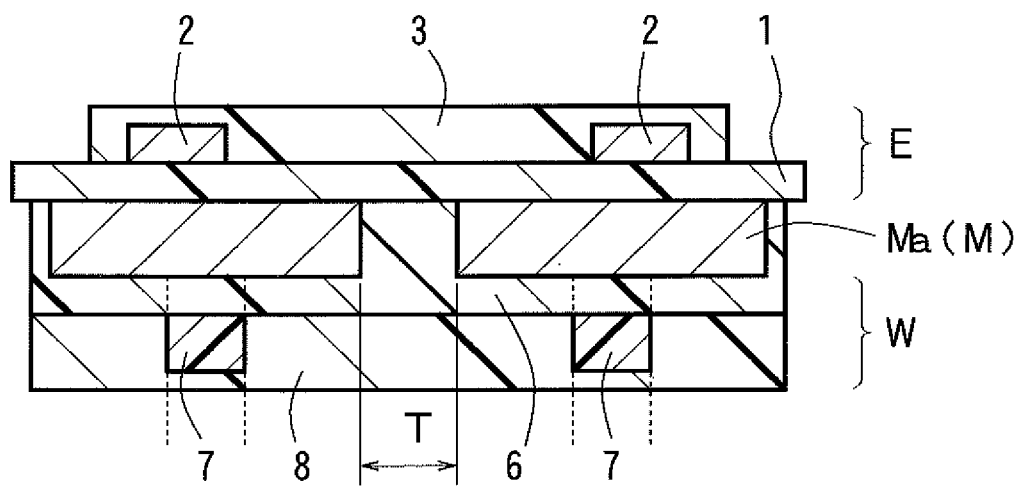

As shown in FIG. 5A, the lower limit value of the width of patterned portions Ma of the metal layer M having the pattern is equal to the width of the cores 7 (as indicated by dotted lines shown). If the width of the patterned portions Ma is increased until adjacent ones of the patterned portions Ma come in contact with each other, the second preferred embodiment is similar to the first preferred embodiment (with reference to FIG. 1B). However, for the patterning as in the second preferred embodiment, the width of the patterned portions Ma preferably has an upper limit value which causes a spacing T between adjacent ones of the patterned portions Ma to be equal to 10 µm, as shown in FIG. 5B.

In the second preferred embodiment, the metal layer M may be partially left unremoved between adjacent ones of the patterned portions Ma in the portions other than the bent portion (the portions in the region F) so that adjacent ones of the patterned portions Ma are partially connected to each other, and the connections may be reinforced.

In the aforementioned preferred embodiments, the opto-electric hybrid board bent in the bent portion (the longitudinal middle) thereof is used. However, the opto-electric hybrid board repeatedly bent in the longitudinal middle thereof may be used. The use of the opto-electric hybrid board in this manner causes no breaks in the metal layer M to cause no breaks in the cores 7 of the optical waveguide W because the metal layer M is removed from the longitudinal middle. In other words, the opto-electric hybrid board is excellent in resistance to repeated bending.

Figure 6:
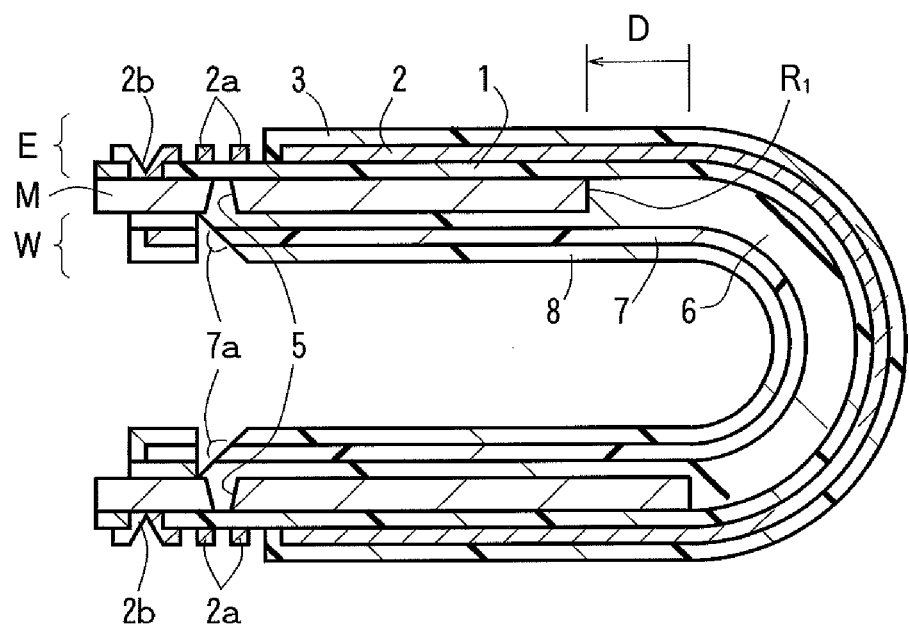
FIG. 6 is a longitudinal sectional view schematically showing an opto-electric hybrid board according to a modification of the first and second preferred embodiments.

In the aforementioned preferred embodiments, the portion of the metal layer M corresponding to the bent portion (the longitudinal middle) is removed. However, as shown in longitudinal sectional view in FIG. 6, the area of the removal of the metal layer M may be extended longitudinally (as indicated by the arrow D shown) to portions other than the bent portion. This maintains the bendability if the opto-electric hybrid board is slid longitudinally so that the bent portion is longitudinally out of position.

Although the optical waveguide W is positioned inside when the opto-electric hybrid board is bent in the aforementioned preferred embodiments, the electric circuit board E may be positioned inside when the opto-electric hybrid board is bent.

The opto-electric hybrid board in the aforementioned preferred embodiments has the single bent portion. However, the opto-electric hybrid board may have a plurality of bent portions, in which case the metal layer M is removed in a corresponding plurality of sites.

Next, inventive examples of the present invention will be described in conjunction with comparative examples. It should be noted that the present invention is not limited to the inventive examples.

EXAMPLES

Inventive Examples 1 and 2

The opto-electric hybrid board prior to bending (with reference to FIG. 3D) in the first preferred embodiment was prepared as an opto-electric hybrid board in Inventive Example 1, and the opto-electric hybrid board prior to bending in the second preferred embodiment was prepared as an opto-electric hybrid board in Inventive Example 2. Each of the opto-electric hybrid boards in Inventive Examples 1 and 2 included a stainless steel layer (metal layer) having a thickness of 18 µm, an insulative layer having a thickness of 5 µm, a first cladding layer having a thickness (as measured from the back surface of the stainless steel layer) of 20 µm, cores having a thickness of 50 µm and a width of 50 µm, and a second cladding layer having a thickness (as measured from the front surface of the first cladding layer) of 70 µm. In Inventive Example 2, patterned portions of the stainless steel layer corresponding to the pattern of the cores had a width equal to the width (50 µm) of the cores.

Comparative Examples 1 and 2

Figure 7:
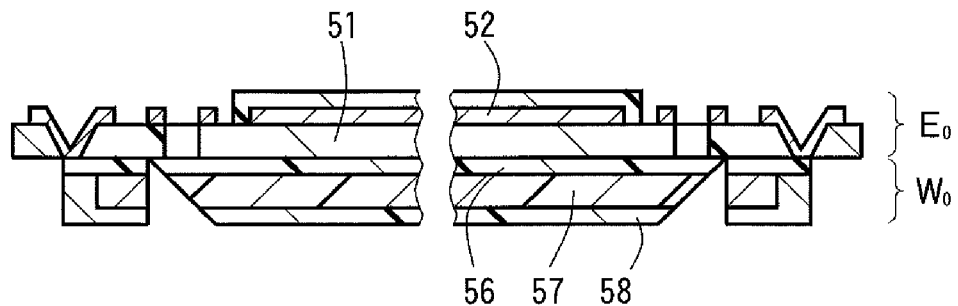
FIG. 7 is a longitudinal sectional view schematically showing a conventional opto-electric hybrid board.
Figure 8:
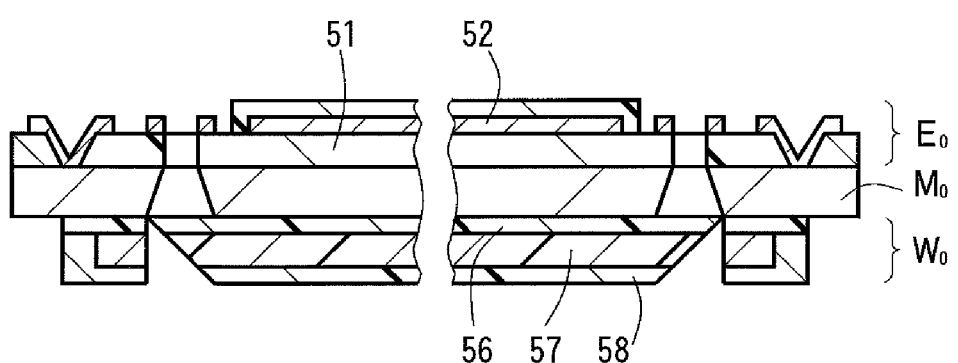
FIG. 8 is a longitudinal sectional view schematically showing another conventional opto-electric hybrid board.

The opto-electric hybrid board shown in FIG. 7 was prepared as an opto-electric hybrid board in Comparative Example 1, and the opto-electric hybrid board shown in FIG. 8 was prepared as an opto-electric hybrid board in Comparative Example 2. The components, including the stainless steel layer and the like, of the opto-electric hybrid boards in Comparative Examples 1 and 2 had dimensions equal to those in Inventive Examples 1 and 2.

<Measurement of Light Propagation Losses>

A light-emitting element (ULM850-10-TT-C0104U available from U-L-M photonics GmbH) and a light-receiving element (PDCA04-70-GS available from Albis Optoelectronics AG) were prepared. The amount of light $I_0$ was measured when light emitted from the light-emitting element was directly received by the light-receiving element. Then, the light-emitting element was mounted on optical element mounting pads in one end portion of each of the opto-electric hybrid boards in Inventive Examples 1 and 2 and Comparative Examples 1 and 2, and the light-receiving element was mounted on optical element mounting pads in the other end portion thereof. Next, the amount of light I was measured when light emitted from the light-emitting element was received by the light-receiving element via the cores of the optical waveguide. Based on the values of the amounts of light $I_0$ and I, $[-10 \times \log(I/I_0)]$ was calculated, and divided by the length of the cores. The results of the division were determined as light propagation losses. The results were listed in Table 1 below.

<Resistance to Repeated Bending>

Each of the opto-electric hybrid boards in Inventive Examples 1 and 2 and Comparative Examples 1 and 2 was bent in the longitudinal middle thereof (a to-be-bent portion), and first and second longitudinal portions of each opto-electric hybrid board which were on opposite sides of the bent portion were brought into a face-to-face relation. In that state, each opto-electric hybrid board was set in a slide test machine. Then, the first and second longitudinal portions were repeatedly reciprocated so as to slide in opposite directions from each other. The height of each opto-electric hybrid board in a bent position was 4 mm, and the slide stroke was 20 mm. Then, the number of reciprocations was counted until a break occurred in each opto-electric hybrid board. The results were as follows: no breaks occurred after 10,000 reciprocations in Inventive Examples 1 and 2 and Comparative Example 1, whereas a break occurred after ten reciprocations in Comparative Example 2. The results were listed in Table 1 below.

TABLE 1

|  | Inv. Ex. 1 | Inv. Ex. 2 | Comp. Ex. 1 | Comp. Ex. 2 |
| --- | --- | --- | --- | --- |
| Light Propagation Loss (dB/cm) | 0.11 | 0.12 | 0.27 | 0.10 |
| Bendability (Number of Times) | 10000 | 10000 | 10000 | 10 |

The results in Table 1 show that the light propagation losses in Inventive Examples 1 and 2 make no significant difference from the light propagation loss in Comparative Example 2 including the stainless steel layer. However, the results in Table 1 show that Inventive Examples 1 and 2 are much more excellent in resistance to repeated bending than Comparative Example 2. The results in Table 1 also show that Comparative Example 1 has resistance to repeated bending but is high in light propagation loss.

The opto-electric hybrid board is usable in instances where the use of the opto-electric hybrid board in a small space and in a movable section such as a hinge is required.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An opto-electric hybrid board, comprising:
   an electric circuit board including an insulative layer having front and back surfaces, and electrical interconnect lines formed on the front surface of the insulative layer;
   an optical waveguide including a cladding layer and cores, the optical waveguide being formed on the back surface of the insulative layer of the electric circuit board; and
   a metal layer formed between the cladding layer of the optical waveguide and the back surface of the insulative layer of the electric circuit board,
   wherein part of the opto-electric hybrid board is formed as a to-be-bent portion,
   wherein the metal layer is partially removed in a position corresponding to the to-be-bent portion, and
   wherein the cladding layer of the optical waveguide fills a site where the metal layer is removed.

2. The opto-electric hybrid board according to claim 1,
   wherein the metal layer is patterned in a position corresponding to the pattern of the cores of the optical waveguide in portions other than the to-be-bent portion, and
   wherein the cladding layer of the optical waveguide fills a site where the metal layer is removed by the patterning.

3. A method of manufacturing an opto-electric hybrid board according to claim 1, comprising:
   forming an insulative layer on a first surface of a metal layer;
   forming electrical interconnect lines on a surface of the insulative layer; and
   forming an optical waveguide on a second surface of the metal layer, wherein part of the metal layer corresponding to a to-be-bent portion of the opto-electric hybrid board is removed by etching prior to the step of forming the optical waveguide.

* * * * *